United States Patent [19]

Geissler

[11] 4,233,648
[45] Nov. 11, 1980

[54] ADJUSTABLE DIRECT AND BOUNCE PHOTOFLASH UNIT

[75] Inventor: Udo M. Geissler, Munich, Fed. Rep. of Germany

[73] Assignee: Patent-Treuhand-Gesellschaft, Munich, Fed. Rep. of Germany

[21] Appl. No.: 33,537

[22] Filed: Apr. 26, 1979

[30] Foreign Application Priority Data

May 19, 1978 [DE] Fed. Rep. of Germany ... 7815176[U]

[51] Int. Cl.³ .............................................. G03B 15/02
[52] U.S. Cl. ...................................... 362/17; 362/18; 362/297; 362/310
[58] Field of Search ................... 362/17, 18, 297, 310

[56] References Cited

U.S. PATENT DOCUMENTS 3,869,604  3/1975  Prochnow .................... 362/16 X

Primary Examiner—Stephen J. Lechert, Jr.
Attorney, Agent, or Firm—Frishauf, Holtz, Goodman & Woodward

[57] ABSTRACT

The casing of a photoflash unit has an upper portion 1, the bottom of which is pivoted on a horizontal axis A—A at the top of the bottom portion 2, so that the top portion can be tilted back to raise the plane of two of the three reflectors lined up with the axis of tilt as their focal line, on which a photoflash tube is disposed. The third reflector, located in the middle between the two that can be tilted up, is fixed with respect to the bottom part of the casing and provides the minimum necessary amount of direct illumination.

3 Claims, 3 Drawing Figures

ADJUSTABLE DIRECT AND BOUNCE PHOTOFLASH UNIT

This invention concerns a flash illumination apparatus, such as is used for photoflash purposes, having provision for a convenient adjustment of the amount of indirect illumination provided by the unit at the same time as direct illumination is provided.

Photoflash attachments for cameras are known in which a certain amount of the light produced by a flash bulb or a flash tube is upwardly directed for indirect illumination (bounce flash) while at the same time some of the illumination is projected forward, parallel to the axis of the camera lens, for direct illumination. When such arrangements are incorporated in flash bulbs, they involve a fixed distribution of the direct and indirect illumination and the angle at which the indirect illumination is projected is likewise fixed. Flash attachments have also been made which are designed to swivel on the camera, so that the entire flash may be directed upward for indirect illumination by diffused reflection from a ceiling, when that is preferred to direct illumination. Efforts to adjust the distribution angle of a partial indirect illumination have generally resulted in cumbersome arrangements.

It is an object of the present invention to provide a convenient and handy method of easily adjusting the deviation of a portion of the illumination provided by a flash tube to suit the possibilities at the scene for indirect illumination or, selectively, to utilize the apparatus entirely for direct illumination.

SUMMARY OF THE INVENTION

Briefly, the flash illumination device is mounted in a casing of generally flat-box shape, which may have rounded ends, made up of two bodies of identical rectangular cross-section pivoted on each other in the mid-portion of the device on an axis parallel to the width dimension lying substantially in the median plane of the device, and one of these bodies carries a central and relatively narrow parabolic cylinder reflector, while the other carries a pair of wider parabolic cylinder reflectors, all these reflectors having the axis of pivoting of the two bodies, which is also the axis of the flash tube mounted therein, as their focal axes. The component body of the casing which carries the central reflector is preferably the one at the other end of which a mounting foot is provided for the unit. A cylindrical window having the cross-section of a circular arc centered on the pivot axis is so mounted that as the two portions of the casing are moved over a range of angles about their common pivot, the window serves the flash tube and the various reflectors to allow light to be projected therethrough.

This arrangement makes very convenient a manual adjustment between the position in which all the light is projected in the same direction by aligning all the reflectors and various positions in which the light from the side reflectors is projected more or less upward at an angle selected to suit the conditions of the scene.

BRIEF DESCRIPTION OF THE DRAWINGS

The invention is further described with reference to an illustrative embodiment by reference to the annexed drawings, in which.

DETAILED DESCRIPTION OF THE ILLUSTRATED EMBODIMENT

The casing is made of two portions 1 and 2, each preferably made of synthetic plastic of rectangular cross-section pivoted together one on the other about the axis A—A. The casing bulges somewhat where the two box-like parts are pivoted and joined and form a cylindrical mid-portion of a diameter slightly larger than the thickness, or smallest dimension, of the casing.

On the front side of the casing, the cylindrical portion where the two members 1 and 2 join is open to provide a window with a transparent curved pane 4 of cylindrical curvature. Through this window, the flash tube 5 of an electronic flash unit contained in the casing and not otherwise shown here is visible, being located on the axis A—A.

Figure 1:
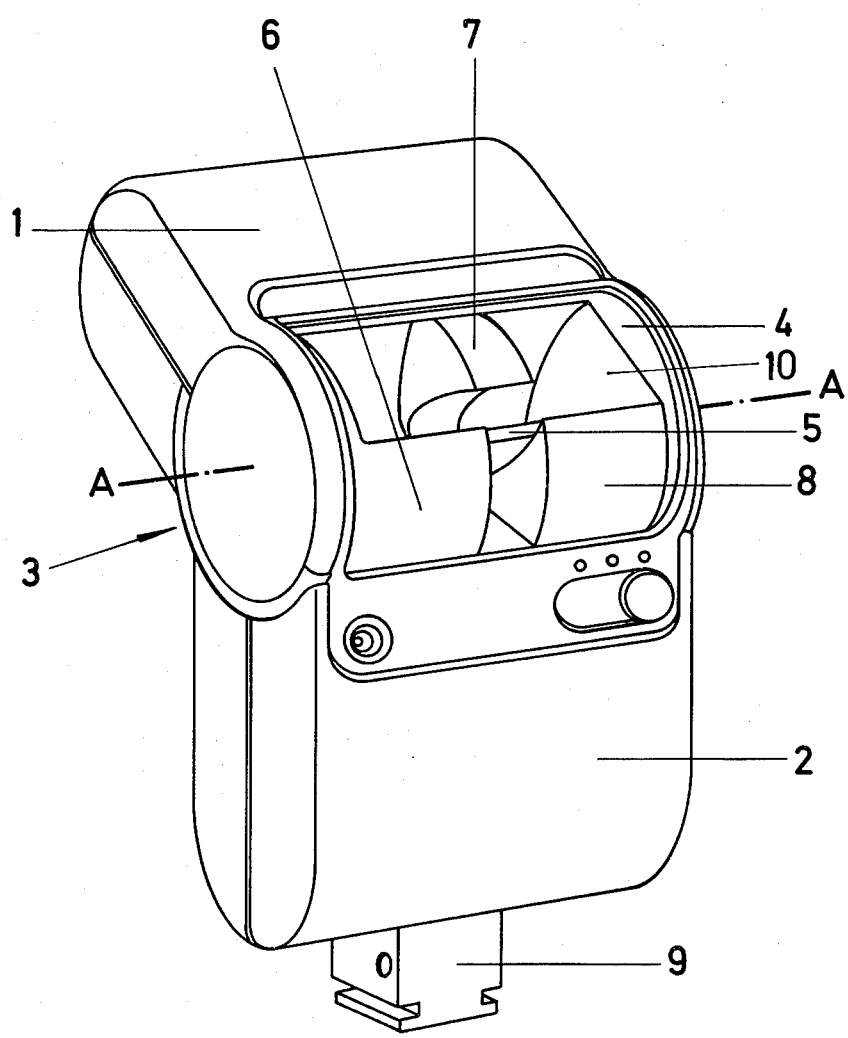
FIG. 1 is a perspective view of an embodiment of the invention in a position of maximum upward tilt of the light projected by the side reflectors.
Figure 2:
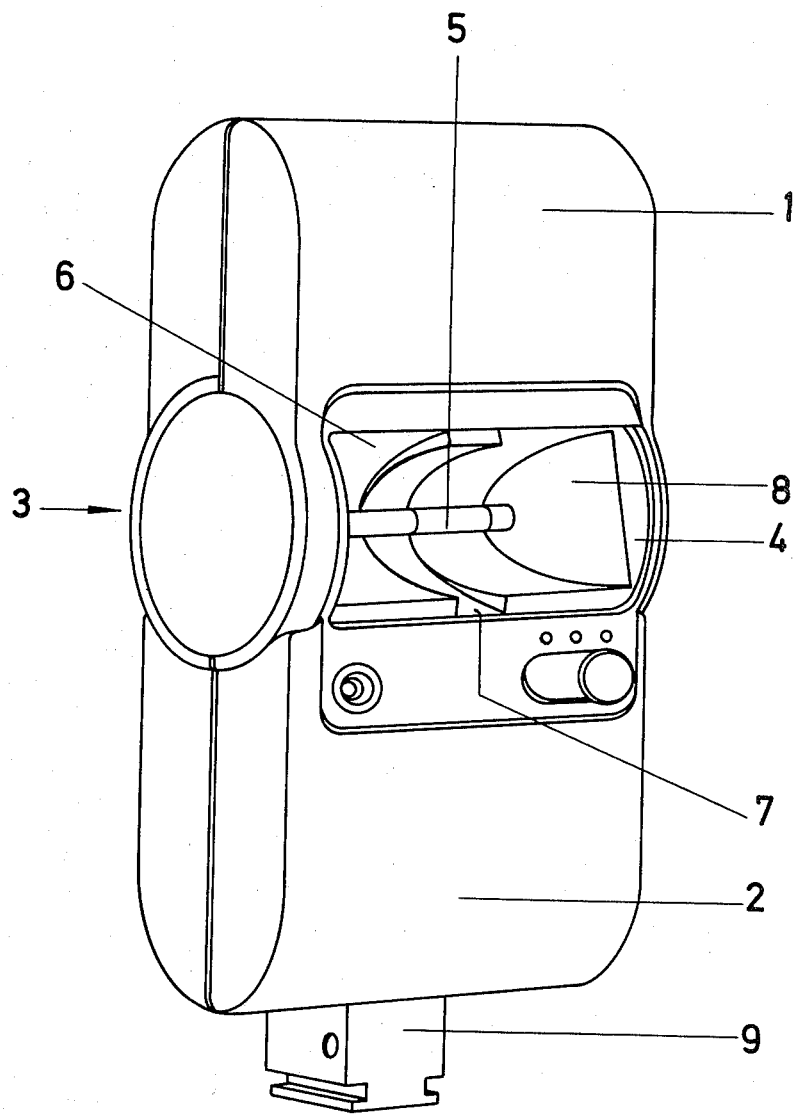
FIG. 2 is a perspective view of the device in FIG. 1 in a position for a very slight upward tilt of the light projected by the side reflectors relative to that projected by the central projector.
Figure 3:
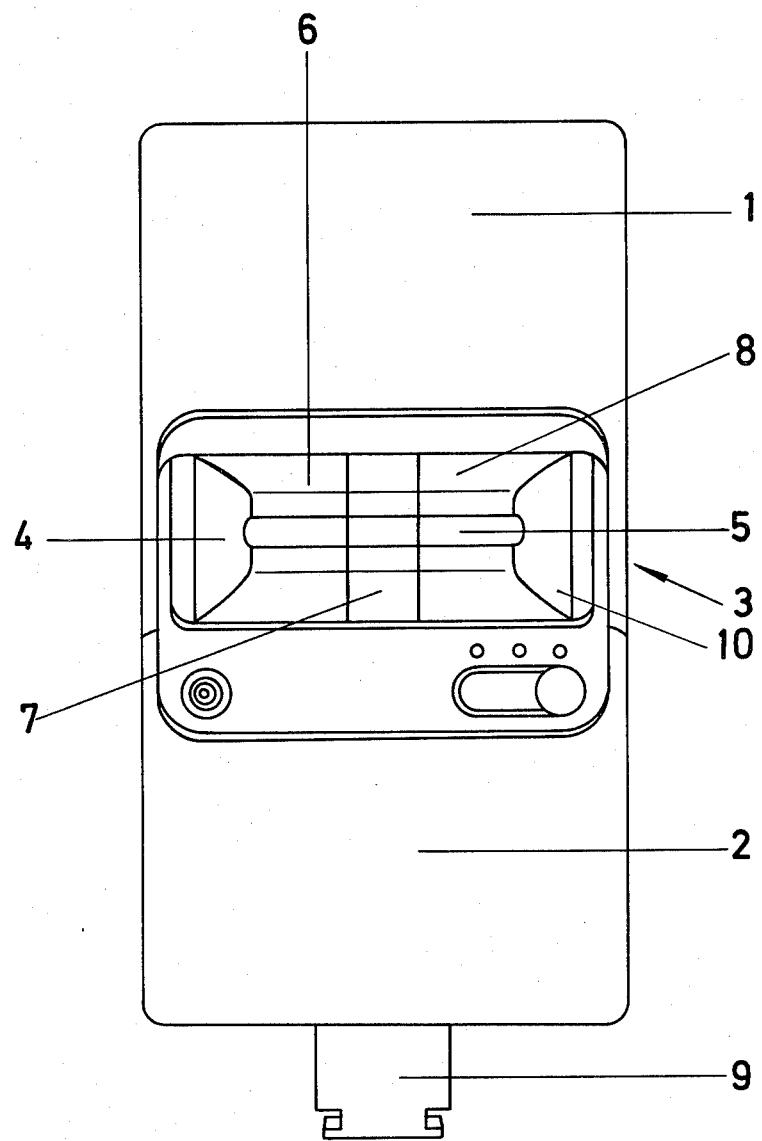
FIG. 3 is a front elevation of the device of the invention in a position in which the reflectors are aligned for maximum direct illumination.

The window has its minimum size when the two parts 1 and 2 of the casing are in line, the position illustrated in FIG. 3. When the upper part 1 of the casing is bent back, the window is enlarged and a portion of the cylindrical pane 4 which was hidden in the casing in FIG. 3, comes out to serve as part of the window. FIG. 1 represents approximately the maximum opening of the window. For this purpose, it makes no difference whether the window pane 4 is fixed on portion 1 or portion 2 of the casing, as the device may be constructed equivalently either way.

Three reflectors elements 6, 7 and 8 are lined up on the axis A—A, having reflection surfaces in each case of parabolic cylinder shape, for which the axis A—A is the focal axis. The central reflector 7 is narrower in the dimension of the axis A—A and has a fixed position relative to the casing portion 2, which is the casing portion equipped with a conventional mounting foot 9 for mounting on a camera and providing the connections for synchronization of the flash with the camera shutter operation.

The reflectors 6 and 8, located on either side of the reflector 7, are arranged to be swung about the focal line which is the axis A—A, as the casing portion 1 is swung out of the vertical position. In the illustrated case, this is done simply by connecting them with the casing 1 in fixed relation thereto, since that casing 1 swings about the axis A—A on which it is pivoted relative to the casing portion 2. As the casing portion 1 is swung back, the plane passing through the focal line and the vertex line of each of the reflectors 6 and 8, which plane represents the directivity of these reflectors, swings upward, in the illustrated case in a direction perpendicular to the front plane of the casing portion 1. At the same time, the window 4 opens up so that it permits all the light reflected by the reflectors 6 and 8, as well as all the light reflected by the reflector 7, to be projected out of the unit through the window 4.

As shown in FIG. 3, the laterally outward ends of the reflectors 6 and 8 are closed off by oblique reflecting walls 10 to avoid scattering out light too widely in the front horizontal half-plane.

In the aligned or straight-up position of the casing portions 1 and 2, illustrated in FIG. 3, the device shown can be used as an ordinary direct illumination photoflash unit. When it is desired to utilize a ceiling to provide diffused reflected light, all that it is necessary to do is to tilt back the casing portion 1, the amount of tilt depending upon the relative location of the ceiling, the object and the camera. Furthermore, the amount of indirect lighting can be reduced and the amount of direct lighting at the same time increased if the casing portion 1 is tilted back less than the optimum amount for maximum ceiling-reflected light.

The provision of some direct lighting not only relieves shadows, but reduces the sensitivity of the exposure adjustment to finding the optimum angle of indirect lighting. It is preferable, however, to provide the unit of the present invention with an electronic flash system of the computing type with a sensor, for cutting off the flash discharge at a time related to the amount of light reflected back from the field of view. Such systems are well known and need not be further described here.

If the camera is turned on its side to take a picture, as is common when taking a vertical picture with an oblong format, the unit can be used to provide auxiliary indirect lighting with a side reflector, either a wall or a screen, instead of with a ceiling. Of course, with the unit mounted independently of the camera and connected to the camera by a cable for synchronization with the shutter, the choice of indirect lighting from above or from the side can be made independently of the picture format.

The device of the invention provides an easy and handy way of selecting between direct illumination and illumination partly direct and partly indirect, and also for adjusting the relative amounts of direct and indirect illumination and adjusting the illumination to the particular indirect illumination conditions.

The central reflector is made narrow partly because it is somewhat better illuminated on account of its central position and partly because by having the predominant amount of light directed by the side reflectors 6 and 8, a sufficiently large portion of the illumination can be made indirect when the optimum upward tilt for indirect illumination is provided. The amount of direct illumination for those just-mentioned conditions is preferably determined by the width of the central reflector 7, and can be just sufficient for relieving the deeper shadows. Then, if more of the direct illumination is desired, all that is needed is to tilt the reflectors 6 and 8 somewhat more downward by a gentle readjustment of the angle of tilt of the casing portion 1.

Although the invention has been described with reference to a particular illustrated embodiment, variations are of course possible within the inventive concept. Thus, a mechanism could be provided in the mounting of the reflectors 6 and 8 on the casing portion 2, so that these reflectors would be tipped up by an angle proportional to the angle of tilt-down of the casing portion 2, rather than an angle equal to it, for example by half or two-thirds of the tilt of the casing portion 2.

I claim:

1. Flash illumination apparatus usable selectively for full or variably partial direct illumination comprising, in combination:

a casing consisting of two box-like bodies having the same rectangular cross-sectional dimensions, pivoted one on the other on an axis parallel to the width dimension of said bodies lying on the median plane of both of them;

a flash tube centered on said axis running substantially across said casing;

a cylindrical transparent window of variable width having a cylindrically formed sheet of transparent material mounted on one of said bodies and fitted in an opening and a mounting in both of said bodies so as to maintain a window centered on said flash tube over a range of relative positions of said two bodies obtainable by pivoting one on the other;

a mounting foot on one of said bodies at the end thereof remote from the connection to the other of said bodies;

a centrally disposed reflector substantially in the shape of a parabolic cylinder having said axis as its focal line and affixed to one of said bodies, and a pair of reflectors located on either side of said central reflector and substantially in the shape of parabolic cylinders having said axis as the respective focal lines thereof, said pairs of reflectors being fixed on the one of said bodies other than the one on which said central reflector is fixed, whereby manual tilting of that one of said bodies other than the one on which foot is affixed determines the amount of deviation of light projected from said flash tube by said pair of reflectors from the light projected by said central reflector when said flash tube is operated.

2. A flash illumination apparatus as defined in claim 1, in which said body on which said central reflector is fixed is the body on which said mounting foot is fixed.

3. A flash illumination apparatus as defined in claim 1 or claim 2 in which said bodies of said casing are enlarged in their narrowest dimension at and near the place where they are pivoted one on the other in such a shape as to form a cylindrical mid-portion of said casing.

* * * * *